United States Patent [19]

Ferrara

[11] Patent Number: 4,624,642
[45] Date of Patent: Nov. 25, 1986

[54] VERTEBRAE DEMONSTRATION APPARATUS

[76] Inventor: Angelo N. Ferrara, 1845 Union Center Hwy., Endicott, N.Y. 13760

[21] Appl. No.: 713,179

[22] Filed: Mar. 18, 1985

[51] Int. Cl.⁴ .............................................. G09B 23/32
[52] U.S. Cl. .................... 434/274; 434/257; 434/428
[58] Field of Search ............... 434/256, 257, 274, 428, 434/314, 267, 275; 273/239

[56] References Cited

U.S. PATENT DOCUMENTS

| 3,986,276 | 10/1976 | Valentine | 434/314 |
| 3,990,157 | 11/1976 | Valentine | 434/314 |
| 4,006,537 | 2/1977 | Valentine | 434/314 |

OTHER PUBLICATIONS

Clay–Adams 1953 Catalog, p. 193, to "Michel Anatomy Charts".
Charles Mayer Studios Flyer Copright 1960, 434–430.
F0 300 Mandi-Max Magnetic Board, p. M14 of Flyer from National Biological Lab. Oskosh, Wisc. Rec'd May 7, 1970.

Primary Examiner—Harland S. Skogquist
Attorney, Agent, or Firm—Richard G. Stephens

[57] ABSTRACT

A metal panel carries views depicting a human spine. A plurality of movable pieces corresponding in shape to vertebrae or disks depicted on the panel are provided with magnet means, so that the pieces may be placed to overlie vertebrae areas on the panel to illustrate normal spinal conditions, and may be shifted on the panel to illustrate abnormal conditions.

7 Claims, 3 Drawing Figures

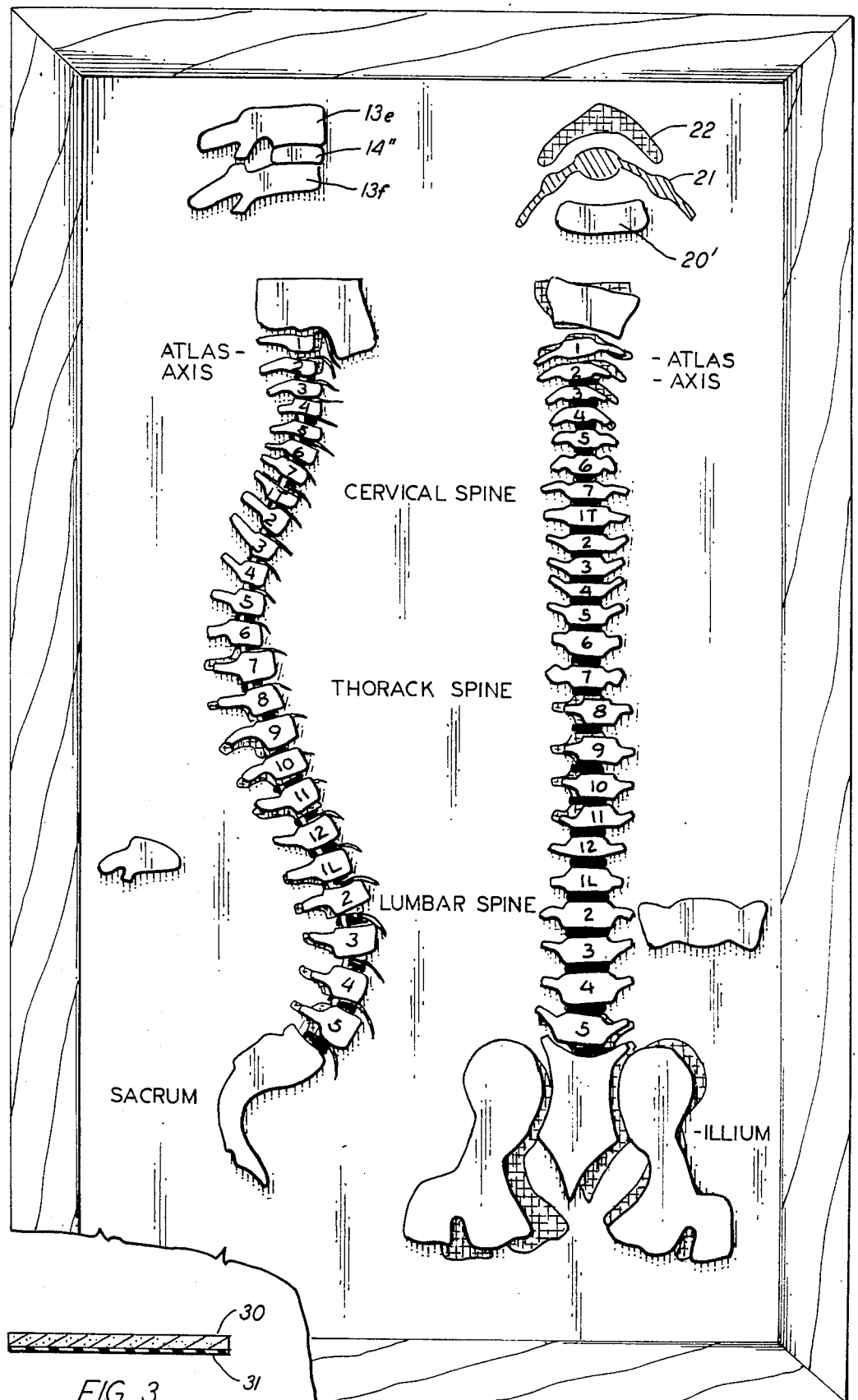

VERTEBRAE DEMONSTRATION APPARATUS

My invention relates to educational apparatus, and more particularly, to apparatus by means of which chiropractors, physicians, osteopaths and others may readily educate patients and others about spinal conditions, and especially about deviations from normal which occur in the human spine.

Most lay persons suffering from spinal problems have little knowledge of vertebrae, and hence a purely oral description of their problem by a chiropractor or physician tends to be largely incomprehensible. Normal spinal conditions, and a limited number of abnormal spinal conditions, are pictorially illustrated in various texts, and by showing a patient various pictures, a physician or chiropractor sometimes can convey some understanding of a spinal problem to a patient. However, only a limited number of abnormal conditions are illustrated in available texts, and time can be wasted consulting various texts to find a suitable picture or pictures to use with a given patient. A primary object of the present invention is to provide inexpensive apparatus which may be used to demonstrate virtually any type of spinal condition.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 2 is a similar view with a plurality of movable pieces placed on and magnetically adhered to the panel portion.

FIG. 3 is a representative edge view of one of the movable pieces.

Figure 1:
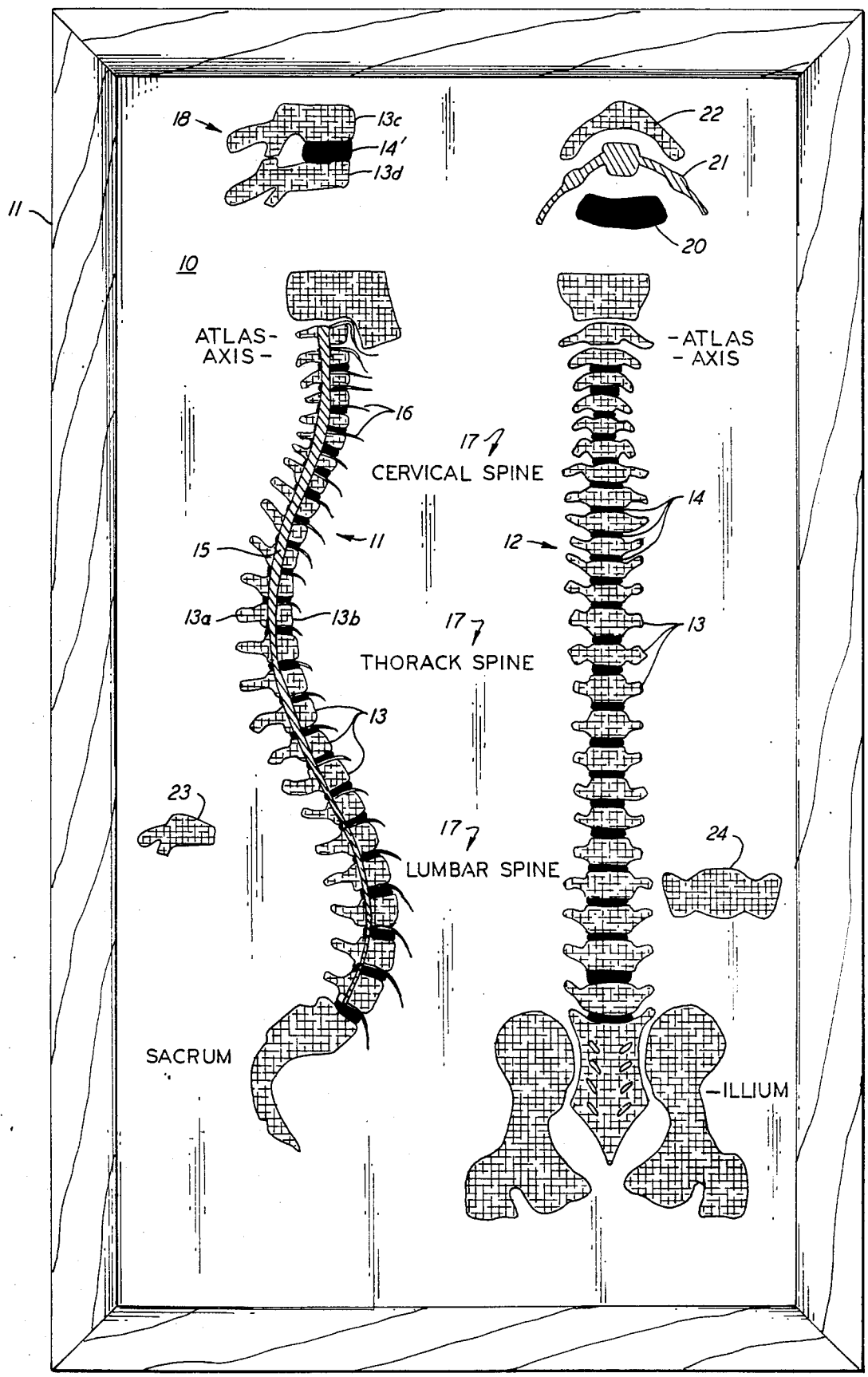
FIG. 1 is a front view of a panel portion of a preferred embodiment of the invention, with a variety of indicia which are silk-screened on, or otherwise depicted on, the face of the panel.

Referring to FIG. 1, a back panel portion of the apparatus of the invention is shown as including a magnetically permeable (e.g. steel) panel 10. In one successful embodiment of the invention panel 10 was 27 inches (68.6 cm.) wide and 39 inches (99 cm.) long, and formed of 24 gauge steel sheet. Panel 10 is preferably mounted in frame 11, to cover the edges of panel 10 to facilitate handling. Frame 11, which may be formed of wood, for example, may be fitted with picture-hanging hardware (not shown), if desired, to facilitate hanging of the apparatus on a wall. The apparatus can instead be laid flat on a desk or table, if desired.

The face of panel 10 is painted or otherwise colored with a background color, upon which two outline views, one a side view 11 and the other a front—to-back view 12, of a normal human spine are depicted, preferably by silk-screening the same onto panel 10. Each of the views includes a plurality of areas 13,13 depicted vertebrae, and a plurality of differently-colored areas 14,14 representing disc spaces between the vertebrae. The side view also includes a long area 15 representing the central nervous system, with nerves 16,16 shown extending therefrom. In the side view a given vertebrae is represented by two areas on opposite sides of the area depicting the central nervous system. For example, the areas at 13a,13b represent front and rear portions of the same vertebrae. Each of the areas in views 11 and 12 have shapes and sizes approximating those of an adult human.

Also shown carried on panel 10, near the upper left corner at 18, is an enlarged view depicting two vertebrae 13c,13d and a disc 14' between them, or an intervertebral foramina, with the posterior joint. Near the upper right corner of panel 10 a top view of the spinal column is depicted in enlarged form, showing a disc at 20, a nerve root at 21, and a spinous process at 22. Near the left edge of the panel a side view of a single vertebrae having a wedge shape is shown at 23. Near the right edge of the panel a top view of a single vertebrae of the sacrum is depicted at 24. Preferably, lettering is also silk-screened on the panel, as at 17,17, to label various regions of the spine, such as the cervical, thoracic, lumbar, sacrum, atlas, axis and ilia.

In addition, the apparatus of the invention includes a plurality of movable pieces each shaped in the form of a respective vertebrae, bone, or disc. The size and shape of each movable piece is such that it will register with and overlie a respective vertebrae area or disc area silk-screened on panel 10. As shown in the edge view of FIG. 3, each movable piece preferably comprises a flat piece 30 of non-magnetic material having magnet means 31 affixed to its rear side. In one successful embodiment of the invention, each piece was formed from ⅛ inch (0.32 cm.) thick Masonite (trademark) composition board, with magnetic rubber sheet about 1/32 inch (0.08 cm.) thick cemented to its rear side. Wood or plastic may be used in lieu of Masonite board, of course, and metal magnets may be embedded in wood, plastic or other pieces rather that using magnetic rubber sheet. The movable pieces each have correct anatomical proportions, with the lumbar vertebrae being larger that the cervical vertebrae, for example, except that the movable pieces used in connection with the enlarged views are correspondingly enlarged, of course.

In FIG. 2 the vertebrae areas of the various views carried on the panel are shown largely covered by movable vertebrae pieces which magnetically adhere to the panel. Several movable pieces are shown in FIG. 2 displaced from their normal positions, so that they do not register with and completely cover the areas on the panel with which they are associated. In the front view at 12, the sacrum and the two ilia pieces, for example, are shown not properly registering with the sacrum and ilia areas carried on the panel. When the movable pieces are placed in their "normal" positions, the disc areas on the panel remain visible, and portions of the central nervous system area remain visible in the side view.

Twenty-six movable pieces are provided to cover the side view outline carried at 11 on panel 10, including a skull piece, seven cervical pieces, twelve thoracic pieces, five lumbar pieces and a sacrum piece. Twenty-eight movable pieces are provided to cover the front view outline carried at 12 on panel 10, including a skull piece, seven cervical pieces, twelve thoracic pieces, five lumbar pieces, a sacrum piece, and two ilia pieces.

The magnetic means on each piece is capable of holding the piece in a fixed place on panel 10 when the panel is arranged vertically, but allowing any piece to be slid on the smooth face of the panel. The movable pieces are preferably numbered on their outside faces to facilitate initial positioning of the pieces in panel 10. Because each movable piece corresponds in shape and size to a bone or disc area depicted on the panel, an untrained person can readily install the pieces on the panel with vertually no change of error, and an untrained person can re-adjust the pieces to show normal spinal conditions after various pieces have been moved to illustrate an abnormal spinal condition.

With the movable pieces initially in their normal positions on the side view on the panel, a doctor can move the cervical pieces in the side view backward or forward to illustrate decreased or increased cervical lordosis, or similarly move thoracic or lumbar pieces to show increases and decreases of lordosis; he can show tilting of the sacrum by moving pieces forward or backward from their normal positions, and the bio-mechanical effect of tilting of the sacrum can be shown by moving the vertebrae above to show how they compensate for a tilted sacrum. Reduction in any disc space can be readily shown by moving two adjacent vertebrae vertically closer together. Individual misalignments are easily shown; for example, spondlyolisthesis can be shown by moving the fifth lumbar forward relative to the sacrum. Using the front view pieces, ilium can be moved up or down to demonstrate leg inequality, a desired region of the spine can be moved left or right to demonstrate scoliosis, compensation for leg inequality can be shown by moving vertebrae pieces above the tilted base in the direction of compensation, and tilting of the skull and misalignment of the atlas-axis group of vertebrae can be shown by moving pieces away from their normal positions to whatever positions the doctor wishes to illustrate. The vertebrae areas 13c, 13d and disc area 14' are shown covered with movable pieces 13e, 13f and 14" in FIG. 2. The disc area 20 in FIG. 1 is shown in FIG. 2 covered by a movable disk piece 20'. The nerve root and spinous process areas are not covered by movable pieces.

By moving the pieces at 13c and 13d in the view at 18, one can demonstrate a decrease in the intervertebral foramina, and by moving the disc piece at 14' one can demonstrate prolapse into the intervertebral foramina. The view at 18 also shows the posterior joints, which are not shown in the lateral view at 11, and hence the operator can demonstrate telescoping of the posterior joints. The pieces at 20-22 can be moved to show travel of the disc into the intervertebral foramina. The wedged vertebrae piece at 23 can be moved to replace the first lumbar vertebrae, allowing the operator to show the effect of that deformed segment on areas above and below it, and the overall effect on posture. In short, an extremely wide variety of abnormal conditions, and magnitudes of abnormal conditions, can be readily demonstrated. The movable pieces also can be shifted on the panel to illustrate how various forms of treatment will correct the abnormal conditions.

In the appended claims the term "bone elements" is intended to be a generic term which includes not only what are normally termed vertebrae, but also added bone-like portions of the human spinal system, including the ilia, the sacrum, and the skull.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for demonstrating spinal conditions, comprising, in combination: a magnetically-permeable panel having a smooth surface carrying a plurality of fixed indicia representing bone elements of a normal human spine and the central nervous system associated therewith; and a plurality of movable pieces having shapes corresponding to respective ones of said indicia, each of said movable pieces comprising a non-magnetic member having magnetic means affixed to it, each of said magnetic means being operable to normally hold a respective movable piece in place on said panel but allow said movable piece to be slid on said surface of said panel.

2. Apparatus according to claim 1 wherein each of said movable pieces has a uniform thickness, and the magnetic means affixed to each movable piece comprises a piece of magnetic rubber sheet.

3. Apparatus according to claim 1 wherein said plurality of indicia include a first group of indicia having shapes representing a side view of said spine and a second group of indicia having shapes representing a front view of said spine.

4. Apparatus according to claim 1 wherein said movable pieces include a piece simulating a side view of a skull, seven pieces simulating side views of seven cervical vertebrae, twelve pieces simulating side views of twelve thoracic vertebrae, five pieces simulating side views of lumbar vertebrae, and a piece simulating a side view of a sacrum.

5. Apparatus according to claim 1 wherein said movable pieces include a piece simulating a front view of a skull, seven pieces simulating front views of seven cervical vertebrae, twelve pieces simulating front views of twelve thoracic vertebrae, five pieces simulating front views of five lumbar vertebrae, a piece simulating a front view of a sacrum, and two pieces simulating front views of two ilia.

6. Apparatus according to claim 1 having at least one movable piece representing a disc area of a human spine.

7. Apparatus according to claim 1 having a pair of indicia on said panel representing two vertebrae of a human spine in enlarged form, and a pair of movable pieces corresponding in shape and size to said indicia of said pair.

* * * * *